(12) United States Patent
Fukatsu

(10) Patent No.: US 7,797,461 B2
(45) Date of Patent: Sep. 14, 2010

(54) PROGRAMMABLE CONTROLLER

(75) Inventor: Noriyasu Fukatsu, Toyko (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/492,626

(22) PCT Filed: May 28, 2003

(86) PCT No.: PCT/JP03/06697

§ 371 (c)(1),
(2), (4) Date: Apr. 14, 2004

(87) PCT Pub. No.: WO2004/107698

PCT Pub. Date: Dec. 9, 2004

(65) Prior Publication Data
US 2006/0064511 A1    Mar. 23, 2006

(51) Int. Cl.
*G06F 3/00* (2006.01)
*G06F 13/12* (2006.01)
*G06F 13/38* (2006.01)
*G06F 13/36* (2006.01)
*H04J 3/00* (2006.01)
*H04J 3/16* (2006.01)
*H04J 3/22* (2006.01)

(52) U.S. Cl. ............... 710/5; 710/63; 710/314; 370/464; 370/465; 370/466; 370/467

(58) Field of Classification Search ......... 370/464–467; 710/11, 105, 315, 5, 63, 314
See application file for complete search history.

(56) References Cited

U.S. PATENT DOCUMENTS 6,539,030 B1 * 3/2003 Bender et al. ............... 370/469
6,609,185 B1 * 8/2003 Walton ........................ 711/167
6,826,195 B1 * 11/2004 Nikolich et al. ............. 370/465
7,116,682 B1 * 10/2006 Waclawsky et al. ......... 370/468
2003/0033419 A1   2/2003 Zou et al.

FOREIGN PATENT DOCUMENTS

| JP | 04-250754 A   | 9/1992 |
|----|---------------|--------|
| JP | 2001-53828 A  | 2/2001 |
| JP | 2311585 A     | 2/2001 |
| JP | 2001-160823 A | 6/2001 |
| JP | 3234240 B2    | 9/2001 |
| JP | 2002-157014 A | 5/2002 |

(Continued)

OTHER PUBLICATIONS

Jan Axelson, "Programming and Circuits for RS-232 and RS-485 Links and Networks," Serial Port Complete, http://www.lvr.com/files/spcch1.pdf, 1998, 10 pages total, Lakeview Research, Madison, WI, USA.

(Continued)

*Primary Examiner*—Chun-Kuan Lee
(74) *Attorney, Agent, or Firm*—Sughrue Mion, PLLC

(57) ABSTRACT

A programmable controller includes a switching unit that switches functions of a serial port so that the serial port can process a general-purpose communication protocol, a computer link-only protocol, and does nothing based on a command received from outside.

8 Claims, 8 Drawing Sheets

FOREIGN PATENT DOCUMENTS

KP    2000-0039643 A    7/2000

OTHER PUBLICATIONS

Craig Peacock, "Interfacing the Serial / RS-232 Port," Beyond Logic Universal Serial Bus, http://www.beyondlogic.org/serial/serial1.htm, Jun. 15, 2005, 7 pages total, Part 3 and 4.

Arc Electonics, "RS232 Data Interface, a Tutorial on Data interface and cables," http://www.arcelect.com/rs232.htm, 16 pages total.

Wikipedia, "Serial Port," http://en.wikipedia.org/wiki/Serial_port, last revised on Mar. 20, 2010, 6 pages total.

* cited by examiner

FIG.8
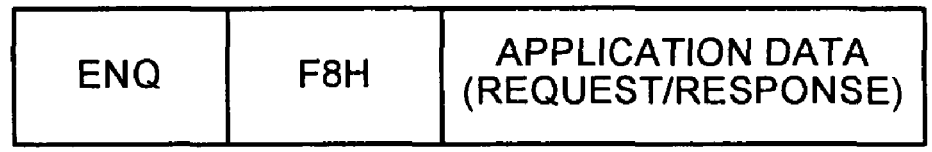

PROGRAMMABLE CONTROLLER

TECHNICAL FIELD

The present invention relates to a programmable controller having a serial port capable of properly using a general-purpose communication protocol function and a computer link-only protocol function.

BACKGROUND ART

Two types of serial communication protocols required for a programmable controller exist: a computer link-only protocol and a general-purpose communication protocol. In the computer link-only protocol, a message to be accessed is fixed to one having a header and application data, and a programmable controller sends and receives data based on a fixed command that is sent from partner equipment (a measuring device, a personal computer and the like). Therefore, the computer link-only protocol does not require a user program. Thus, the computer link-only protocol can read/write device data of the programmable controller or a user program from and into the partner equipment such as the computer and can monitor a state of the programmable controller equipment without preparing the user program in the programmable controller.

On the other hand, because the general-purpose communication protocol can send and receive data in an arbitrary message format which meets the specification of the partner equipment, it is possible to establish communication between a programmable controller and partner equipment which includes other serial port. For this reason, in order to establish the communication between the programmable controller and the partner equipment which includes other serial port, it is necessary to form a sequence program for controlling communication suitable for the communication partner equipment.

A programmable controller having a large number of serial ports becomes costly and bulky; therefore, it is common that the programmable controller includes only one of the computer link-only protocol and the general-purpose communication protocol.

Japanese Patent No. 3234240 discloses a programmable controller with a parameter area into which a parameter for properly using serial ports so that both the computer link-only protocol function and the general-purpose communication protocol function can be used. A parameter for selecting and setting one of a general-purpose communication function and a computer link function is set in this parameter area, and with this configuration, communication control functions of the serial ports are switched.

Japanese Patent Application Laid-open No. 2002-157014 discloses a programmable controller that can switch a communication mode in which a programmable display establishes communication with a personal computer and a communication mode in which a programmable display establishes communication with a PLC, the programmable display includes a communication middleware for switching the communication modes.

The communication middleware switches the communication modes by a set signal from the personal computer which is connected to a serial port in the programmable display.

In the programmable controller disclosed in Japanese Patent No. 3234240, however, if a use is set in accordance with a newly provided parameter area, the use is fixed to the set contents, and the use of the serial port can not dynamically be switched. As a result, there is a problem that both the computer link function and the general-purpose communication function can not be used by switching the communication control processing of the serial port.

In the programmable controller disclosed in Japanese Patent Application Laid-open No. 2002-157014, the middleware itself can not change the communication control method and thus, the communication control method of the programmable display is switched by operating a personal computer. Therefore there is a problem that the personal computer is required apart from the programmable display.

DISCLOSURE OF THE INVENTION

It is an object of the present invention to solve at least the problems in the conventional technology.

According to the present invention, a programmable controller having has a serial port for serial communication and a switching unit that switches the serial port in any one of a first state, a second state, and a third state. The first state being a state in which a general-purpose communication protocol which establishes communication in accordance with a specification of a partner equipment can be processed, the second state being a state in which a computer link-only protocol which establishes communication based on a fixed specification can be processed, and the third state being an idle state. The switching unit switches the serial port to the first state by a command that initializes the serial port in a program for the general-purpose communication protocol when the serial port is in the idling state, to the second state when the serial port receives a signal from external equipment for starting the communication using the computer link-only protocol, to the idling state, upon the serial port being in the first state, by a command that closes the serial port in the program for the general-purpose communication protocol, and to the idling state, upon the serial port being in the second state, after the communication with the external equipment using the computer link-only protocol is completed.

BRIEF DESCRIPTION OF THE DRAWINGS

The other objects, features and advantages of the present invention are specifically set forth in or will become apparent from the following detailed descriptions of the invention when read in conjunction with the accompanying drawings.

FIG. 8 illustrates one example of a communication frame used in a computer link-only protocol.

BEST MODE FOR CARRYING OUT THE INVENTION

Exemplary embodiments of a programmable controller according to the present invention will be explained below in detail. Note that the invention is not limited to this embodiment.

Figure 1:
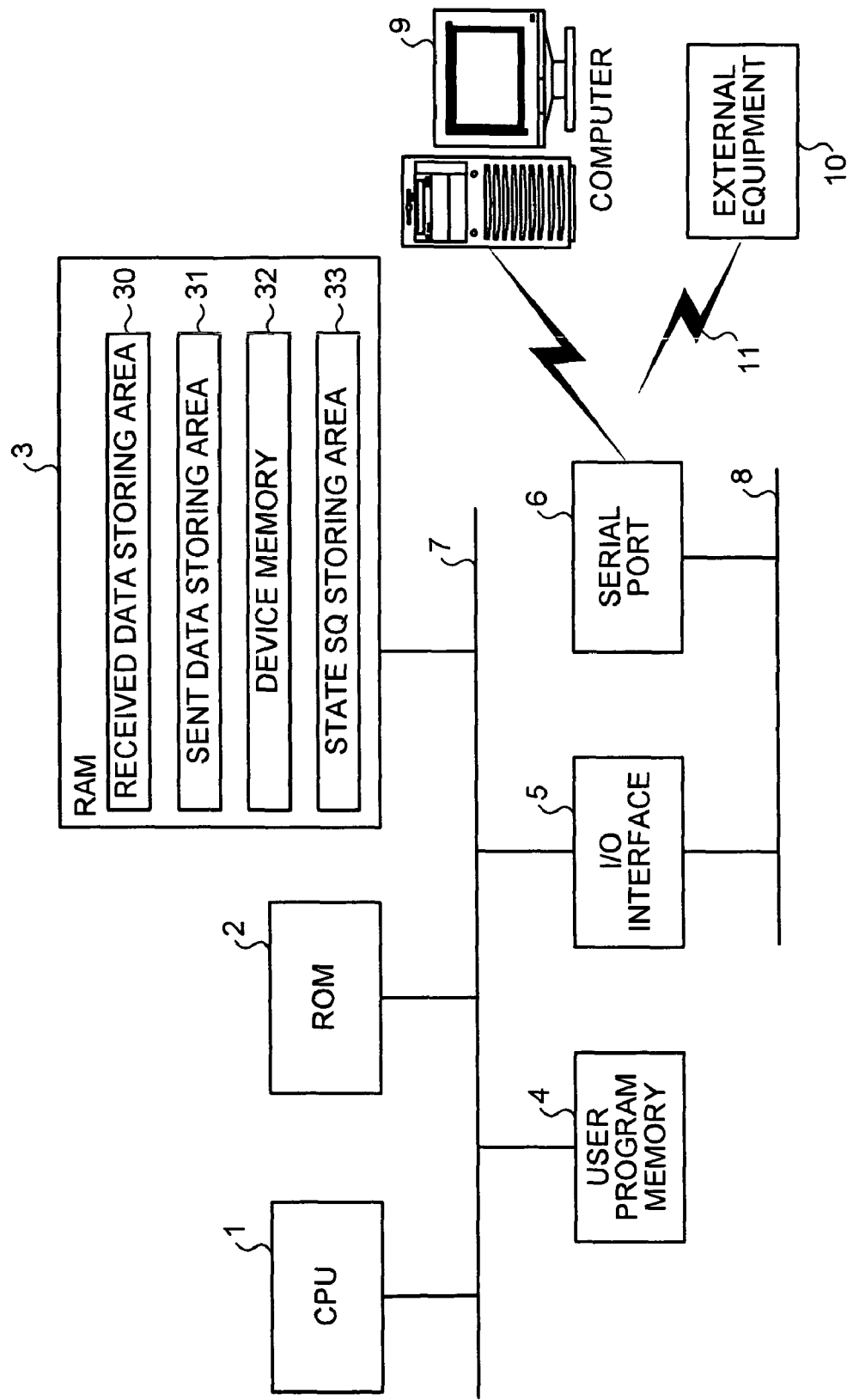
FIG. 1 illustrates a circuit structure of a programmable controller according to an embodiment of the present invention.

FIG. 1 is a block diagram of a programmable controller according to an embodiment of the present invention. This programmable controller includes a CPU 1, a ROM 2, a RAM 3, a user program memory 4, an I/O interface 5, and one or more serial ports 6. The serial port 6 is electrically connected to a computer 9 or external equipment 10 by means of a serial cable 11. One serial port 6 is connected to one external equipment 10.

The CPU 1 processes signals of the entire programmable controller. The ROM 2 stores therein a later-described computer link-only protocol such as a system program and processing procedure of a later-described general-purpose communication protocol or the like.

The RAM 3 stores therein a parameter for defining a work area or operation of a sequence program. The RAM 3 includes a received data storing area 30 for temporarily storing received data at the time of communication and a sent data storing area 31 for temporarily storing sent data at the time of communication. The RAM 3 also includes a device memory 32 for storing a command parameter used at the time of communication as an argument. The device memory 32 is a memory which can freely be used by a user of the programmable controller in a user program stored in the user program memory 4. The device memory 32 stores therein data, historical trend data and the like which are temporarily generated by program computation. The RAM 3 is provided therein with a state SQ storing area 33 for storing a state sequence indicative of a using state of the serial port 6.

The user program memory 4 stores a user program for properly using the general-purpose communication protocol of the serial port 6 and the computer link-only protocol using procedure for the latter protocol. Here, a message to be accessed in the computer link-only protocol is fixed to a message comprising a header and application data, the programmable controller sends and receives data based on a fixed command that is sent from partner equipment (a measuring device, a personal computer or the like) and thus, this computer link-only protocol does not require a user program. On the other hand, the general-purpose communication protocol can send and receive data in an arbitrary message format which meets a specification of the partner equipment, and this protocol can establish communication between the programmable controller and the partner equipment having other serial port.

The I/O interface 5 connects the CPU 1, the ROM 2, the RAM 3 and the user program memory 4 to another peripheral circuit.

The CPU 1, the ROM 2, the RAM 3, the user program memory 4 and the I/O interface 5 are electrically connected to each other through signal lines 7, respectively, so that they can send and receive signals among them.

The serial port 6 is connected to the computer 9 and the external equipment 10 through the serial cables 11, and sends and receives various information among the programmable controller, the computer 9 and the external equipment 10. The serial port 6 and the I/O interface 5 are electrically connected to each other through a signal line 8 so that they can send and receive signals therebetween. The serial port 6 includes a control function for switching between the general-purpose communication protocol and the computer link-only protocol communication using procedure exclusive for this communication carried out between the computer 9 and the external equipment 10.

Figure 2:
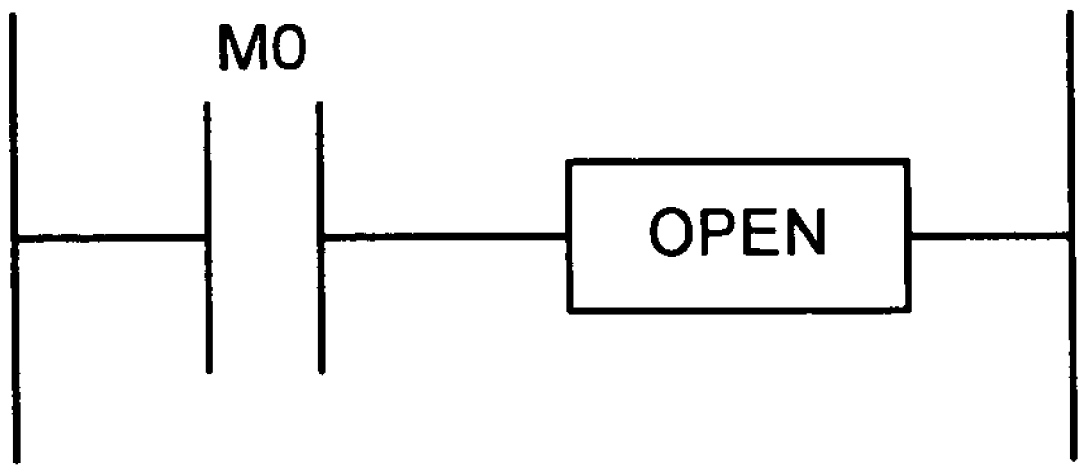
FIG. 2 illustrates a ladder program indicative of a command for initializing a serial port 6.

A ladder program for the general-purpose communication protocol stored in the user program memory 4 will be explained next. FIG. 2 illustrates the ladder program indicative of a command for initializing the serial port 6. A reference symbol M0 represents a state sequence of an OPEN command. When the startup signal M0 is ON, the OPEN command is executed to declare that the serial port 6 is to be used.

Figure 3:
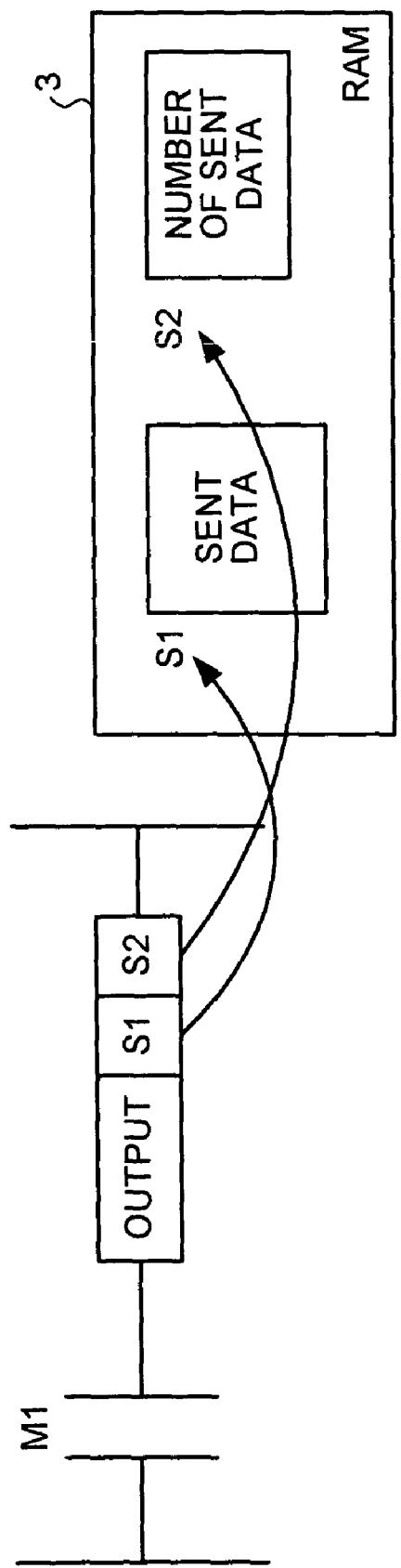
FIG. 3 illustrates a ladder program indicative of a send-command in a general-purpose communication using the serial port 6.

FIG. 3 illustrates a ladder program of a send-command in the general-purpose communication using the serial port 6. A reference symbol M1 represents a state sequence of a send-command, and an argument device S1 and an argument device S2 are arbitrary device numbers in a space of the device memory 32 existing in the RAM 3. When the state sequence M1 is ON, an OUTPUT command is executed, data stored in S2 and thereafter of the argument device by the same number as that of the data stored in the argument device S2 are sent to the computer 9 or the external equipment 10 through the serial port 6 (data is output). Here, when communication with the external equipment 10 or the like is established using the general-purpose communication protocol, data sent by the serial port 6 is temporarily stored in the sent data storing area 31 and then is sent to the external equipment 10.

Figure 4:
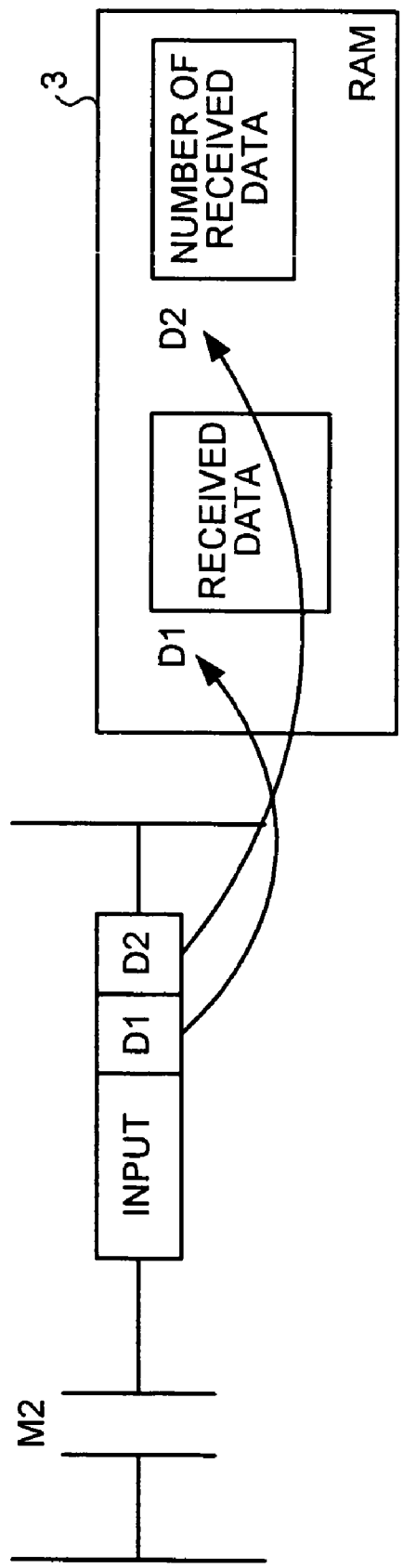
FIG. 4 illustrates a ladder program indicative of a receive-command in the general-purpose communication using the serial port 6.

FIG. 4 illustrates a ladder program indicative of a receive-command in the general-purpose communication using the serial port 6. A reference symbol M2 represents a state sequence of a receive-command, and an argument device D1 and an argument device D2 present arbitrary device numbers in the space of the device memory 32 existing in the RAM 3. When the state sequence M2 is ON, an INPUT command is executed, data received from the computer 9 or the external equipment 10 through the serial port 6 is stored in a device memory 32 in the argument device D2 or thereafter, and the number of data received is stored in the argument device D2. Here, when communication with the external equipment 10 or the like is established using the general-purpose communication protocol, data received by the serial port 6 is temporarily stored in the received data storing area 30 and then is sent to the external equipment 10.

Figure 5:
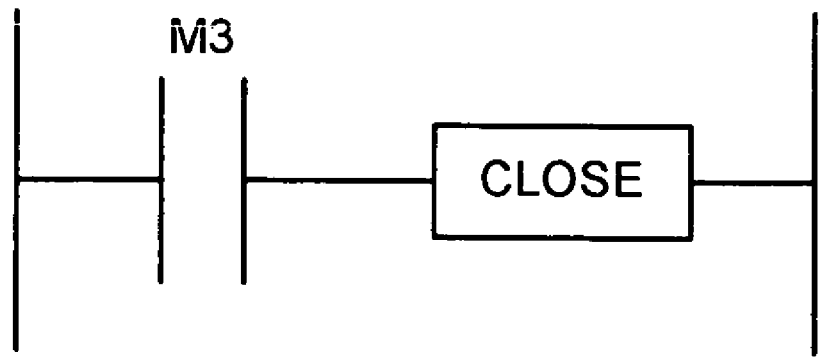
FIG. 5 illustrates a ladder program of a command for finishing the use of the serial port 6.

FIG. 5 illustrates a ladder program of a command for finishing the use of the serial port 6. A reference symbol M3 represents a state sequence of a CLOSE command. When the state sequence M3 is ON, the CLOSE command is executed, and the occupied state of the serial port 6 is released.

The ladder program when the number of serial ports 6 of the programmable controller is one is explained in this embodiment, but even if there are a plurality of serial ports 6 of the programmable controller, a desired one of the serial ports 6 can be selected to establish communication using the general-purpose communication protocol by adding an argument which designates a port number of the serial port 6.

Figure 6:
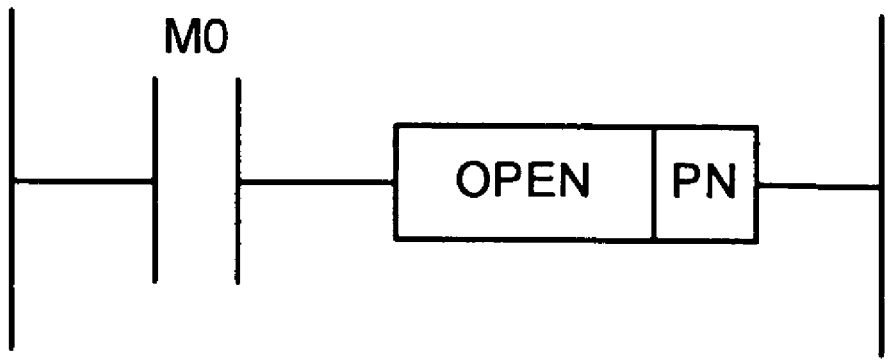
FIG. 6 illustrates a ladder program indicative of a command for designating a port number and initializing the serial port 6.
Figure 7:
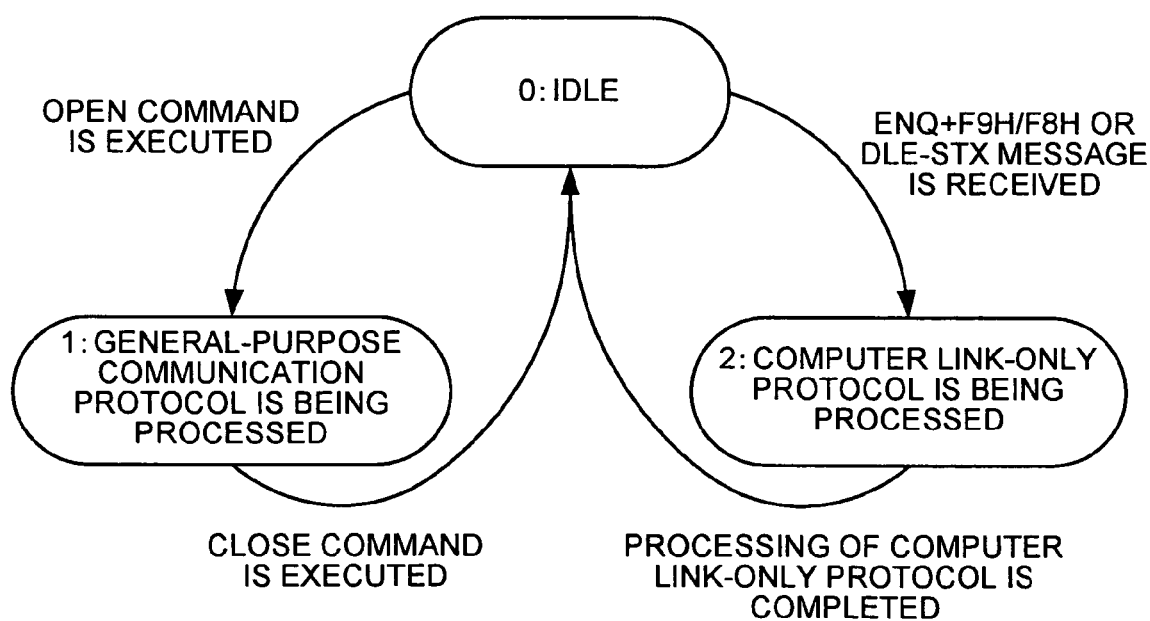
FIG. 7 illustrates a state transition indicating transition contents of a state sequence stored in a state SQ storing area.

FIG. 6 illustrates a ladder program indicative of a command for designating a port number and initializing the serial port 6. If an argument device which designates a port number is defined as PN, it is possible to execute an OPEN command designating a port number by "OPEN PN". Similarly, an OUTPUT command designating a port number by "OUTPUT PN S1 S2" can be executed, and an INPUT command designating a port number by "INPUT PN D1 D2" can be executed. Further, a CLOSE command designating a port number by "CLOSE PN" can be executed FIG. 7 illustrates a state transition indicating transition contents of a state sequence stored in a state SQ storing area. When a sequence value is "0", this indicates an idling state in which no serial port 6 is used. A sequence value "1" indicates that the programmable controller is processing using the general-purpose communication protocol and that the serial port 6 is using the general-purpose communication protocol function. A sequence value "2" indicates that the programmable controller is processing using the computer link-only protocol, and the serial port 6 is using the computer link-only protocol function.

When the serial port 6 is not used, this state indicates that the sequence value is always in the idling state, i.e., "0". If the OPEN command illustrated in FIG. 2 is executed from this state, it is declared that the serial port 6 is used for the general-purpose communication protocol, and the general-purpose communication protocol is being used by the serial port 6, and the sequence value is brought into "1". After the sequence value is brought into "1", the serial port 6 can execute the OUTPUT command and the INPUT command. When the sequence value is "1" and the general-purpose communication protocol is being used by the serial port 6, if the CLOSE command illustrated in FIG. 5 is executed, the serial port 6 is brought into the idling state and the sequence value is turned into "0". If the CLOSE command is executed, the occupied state of the serial port 6 by the general-purpose communication protocol is released.

When the sequence value is "1", the serial port 6 is arranged not to receive a use command in the computer link-only protocol from the external equipment. In a state in which the sequence value is "1", if the use command in the computer link-only protocol is output to the serial port 6 from the external equipment, the serial port 6 informs the external equipment 10 that the serial port 6 can not be used in the computer link-only protocol. With this, the external equipment can recognize that the serial port 6 can not be used in the computer link-only protocol. At that time, since the initializing contents of the serial port 6 are different, the initial setting and the sequence state (use of the serial port 6) of the serial port 6 are not allowed to change.

FIG. 8 illustrates one example of a communication frame used in a computer link-only protocol. This communication frame includes a header added to a head of the communication frame and application data. The communication frame uses characters: i.e., ENQ (05H: Enquiry) which means a response request to a partner, DLE (10H: Date Link Escape) which changes the meaning of characters after DLE, STX (02H: Start of Text) which means a head of the communication frame, and ETX (03H: End of Text) which means completion of the communication frame. Since the heads of the communication frames are varied depending upon specifications of users who use these characters, the computer 9 or the external equipment 10 defines all of ENQ+F9H, ENQ+F8H and DLE+STX as reservation words meaning heads of the communication frames.

When the sequence value of the serial port 6 is "0", i.e., in the idling state in FIG. 7, if the serial port 6, or the computer 9 or external equipment 10 receives a communication frame of ENQ+F9H, ENQ+F8H or DLE+STX, the serial port 6 is brought into a using state of the computer link-only protocol, and the sequence value is turned into "2". In this state, the serial port 6 can use the computer link-only protocol which uses procedure exclusive for this protocol. After the processing of the computer link-only protocol is completed, the serial port 6 is brought into the idling state, and the sequence value is turned into "0".

In a state in which the sequence value is "2", the serial port 6 does not receive the OPEN command, the CLOSE command, the send/receive command of the general-purpose communication protocol. In the state in which the sequence value is "2", if the OPEN command, the CLOSE command, the send/receive command of the general-purpose communication protocol is output to the serial port 6, the serial port 6 informs the user that the general-purpose communication protocol function is not effective. With this, the user can recognize that the serial port 6 can not be used for the general-purpose communication protocol function. If the sequence value is "2", since the initialization contents of the serial port 6 are different, the initializing setting of the serial port 6 and the sequence state (use of the serial port 6) are not allowed to change.

Figure 9:
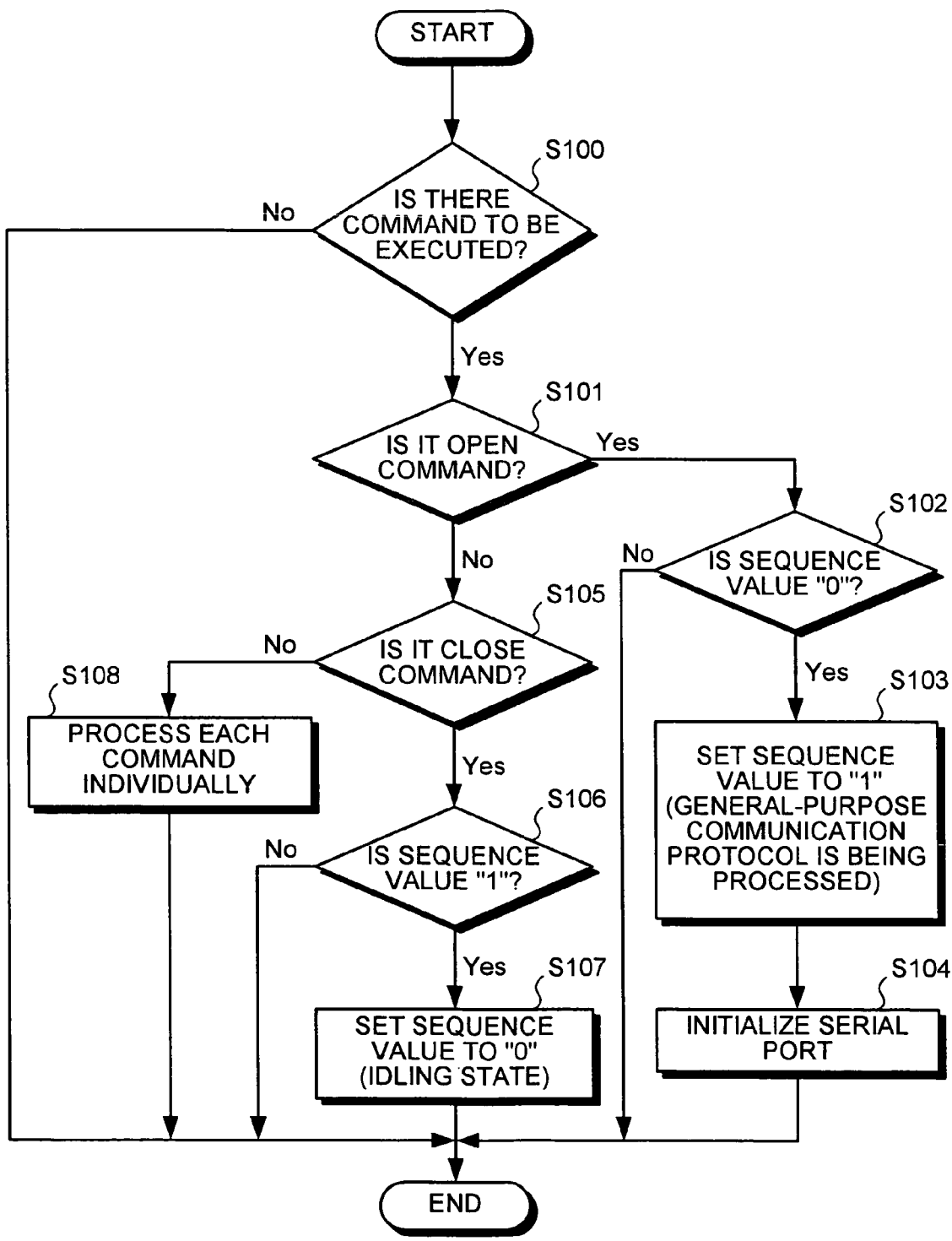
FIG. 9 is a flowchart of a processing when a command of the general-purpose communication protocol is executed

FIG. 9 is a flowchart of a processing when a command of the general-purpose communication protocol is executed. First, it is checked whether the OPEN command, the CLOSE command, the send/receive command of the general-purpose communication protocol is output from the user to the serial port 6 (step S100). If such a command is not executed, the state sequence is not changed, and if the command is executed, it is checked whether the command is the OPEN command (step S101). If the serial port 6 executed the OPEN command, it is checked whether the current sequence value is "0" (step S102). If the sequence value is not "0", since the serial port 6 is being used, the user is informed of the fact that the serial port 6 is being used, and the processing is completed without processing the OPEN command. When the serial port 6 is being used, since there is a possibility that the initializing contents of the serial port 6 are different, the initializing setting of the serial port 6 and the sequence state (use of the serial port 6) are not allowed to change. If it is determined that the sequence value is "0" in step S102, the sequence value of the serial port 6 is changed to "1" (the general-purpose communication protocol is being processed), it is declare that the serial port 6 is occupied (step S103), the serial port 6 is initialized (step S104), and the processing is completed. With this, the send/receive command to and from the serial port 6 by means of the general-purpose communication protocol function can be executed.

If it is determined that the command outputted to the serial port 6 is not the OPEN command in step S101, it is determined whether the command outputted to the serial port 6 is the CLOSE command (step S105). If it is determined that the command outputted to the serial port 6 is the CLOSE command, it is determined whether the current sequence value of the serial port 6 is "1" (step S106). Only if the sequence value of the serial port 6 is "1", the sequence value is changed to "0" (idling state) (step S107), the occupied state of the serial port 6 by the general-purpose communication protocol function is released and the processing is completed.

If it is determined in step S106 that the sequence value is not "1" but is "2", the user is informed that the serial port 6 is being used for the computer link-only protocol, and the processing is completed without processing the CLOSE command. Here, if the serial port 6 is being used, since there is a possibility that the initializing contents of the serial port 6 are different, the initializing setting of the serial port 6 and the sequence state (use of the serial port 6) are not allowed to change. If it is determined in step S103 that the sequence value is not "1" but is "0", the serial port 6 is in the idling state and the processing is completed as it is.

If it is determined in step S105 that the command outputted to the serial port 6 is not the CLOSE command, since this command is the send/receive command of the general-purpose communication protocol, the processing of each command is individually carried out (step S108) and the processing is completed. When the send/receive command is executed, it is checked whether the sequence value is "1", and if the sequence value is not "1", the user is informed that the general-purpose communication protocol can not be used, and the processing is completed without processing the send/receive command. Here, if the sequence value is not "1", since there is a possibility that the initializing contents of the serial port 6 are different, the initializing setting of the serial port 6 and the sequence state (use of the serial port 6) are not allowed to change.

Whenever the user outputs the OPEN command, the CLOSE command, or the send/receive command of the general-purpose communication protocol to the serial port 6, the command is determined and the processing is proceeded.

Because the programmable controller itself can always select and set any one of the general-purpose communication protocol function and the computer link-only protocol function using the procedure exclusive for the latter function, it is unnecessary to set the parameters for properly using both the functions in succession, and both the functions can properly be used with a simple structure.

When the serial port 6 is switched to the general-purpose communication protocol function and the computer link-only protocol function using the procedure exclusive for the latter function, the function which is being used by the serial port 6 is checked, and when the serial port 6 is using other function, the setting of the serial port 6 is not changed. Therefore, it is possible to properly use the general-purpose communication protocol function and the computer link-only protocol function using the procedure exclusive for the latter function in a stable state.

According to the present invention, because there is provided a switching unit that properly uses any one of the general-purpose communication protocol function and the computer link-only protocol function using the procedure exclusive for the latter function, there is effect that it is unnecessary to set the parameters for properly using both the functions in succession, and both the functions can properly be used with a simple structure with the simple structure.

INDUSTRIAL APPLICABILITY

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

As described above, the programmable controller of the present invention is useful for a programmable controller having a serial port, and is especially suitable for a programmable controller requiring both the general-purpose communication protocol function and the computer link-only protocol function using the procedure exclusive for the latter function.

The invention claimed is:

1. A programmable controller having a serial port for serial communication, comprising:

a switching unit that switches the serial port in any one of a first state, a second state, and a third state, the first state being a state in which a general-purpose communication protocol which establishes the serial communication in accordance with a specification of a partner equipment can be processed, the second state being a state in which a computer link-only protocol which establishes the serial communication based on a fixed specification can be processed, and the third state being an idle state, wherein the switching unit switches the serial port to the first state by a first command that initializes the serial port in a program for the general-purpose communication protocol when the serial port is in the idling state, to the second state when the serial port receives a second command comprising a prefix value from external equipment, and the prefix value causing the switching unit to automatically trigger the serial communication using the computer link-only protocol based on the fixed specification, wherein no response to the second command is sent from the serial port of the programmable controller to the external equipment prior to automatically triggering the serial communication using the computer link-only protocol, and the serial communication with the external equipment is established based on only the received second command from the external equipment, to the idling state, upon the serial port being in the first state, by a third command that closes the serial port in the program for the general-purpose communication protocol, and to the idling state, upon the serial port being in the second state, after the serial communication with the external equipment using the computer link-only protocol is completed.

2. The programmable controller according to claim 1, wherein the programmable controller comprises a plurality of serial ports and the first command that initializes the serial ports and the third command that closes the serial ports contains information that designates which one of the plurality of the serial ports is to be selected.

3. The programmable controller according to claim 2, wherein if the first command that initializes the serial port in the program for the general-purpose communication protocol is output when the serial port is in the second state, a user who outputs the first command that initializes the serial port is informed that the serial communication can not be established by the general-purpose communication protocol, and setting of the serial port is not changed.

4. The programmable controller according to claim 3, wherein, if the second command which starts the serial communication using the computer link-only protocol is received from the external equipment when the serial port is in the first state, the external equipment is informed that the serial communication can not be established by the computer link-only protocol, and setting of the serial port is not changed.

5. The programmable controller according to claim 1, wherein the switching unit switches the serial port to the first state using operation for setting the computer link-only protocol.

6. The programmable controller according to claim 5, wherein the operation executed by the switching unit comprises recognizing a received command as the first command or the second command, and wherein, when the received command is recognized as the first command which is an open command for the general-purpose communication, the switching unit switches the serial port to the first state and wherein, when the received command is recognized as the second command which is any command of the computer link-only protocol, the switching unit switches the serial port to the second state.

7. The programmable controller according to claim 1, wherein the switching unit switches the serial port from the first state to the idle state only when a closing command is received and wherein the switching unit automatically switches the serial port from the second state to the idle state when the completion of the serial communication is detected.

8. A method for switching between protocols in serial communication, comprising:

switching a serial port of a programmable controller to one of a first state, a second state, and a third state, wherein the first state is a state in which a general-purpose communication protocol is used for the serial communication with a partner equipment, the second state is a state in which a computer link-only communication protocol which establishes the serial communication based on a fixed specification is used for communicating, and the third state being an idle state, wherein the serial port is switched from the idle state to the first state by a first command that initializes the serial port in a program for the general-purpose communication protocol, and wherein the serial port is switched from the idle state to the second state when the serial port receives a second command from the partner equipment, said second command comprising a frame defined in the computer link-only protocol and the frame comprising a prefix value, and the prefix value automatically triggering the serial communication in the second state using the computer link-only protocol based on the fixed specification, wherein no response to the second command is sent from the serial port of the programmable controller to the partner equipment prior to automatically triggering the serial communication using the computer link-only protocol, and the serial communication with the partner equipment is established based on only the received second command from the partner equipment, wherein the serial port is switched from the first state to the idle state by a third command that closes the serial port in the program for the general-purpose communication protocol, and wherein the serial port automatically detects end of the serial communication with the partner equipment when the computer link-only protocol is used for the serial communication and automatically switches the serial port from the second state to the idle state when the end of the serial communication is detected.

* * * * *